United States Patent [19]

Chen et al.

[11] Patent Number: 5,403,981
[45] Date of Patent: Apr. 4, 1995

[54] STEERING WHEEL INCLUDING SPEED CONTROL SWITCH AND ITS MOUNTING

[75] Inventors: Benjamin S. Chen, Bloomfield Hills; Michael S. Mahrous, Ann Arbor, both of Mich.

[73] Assignee: Chrysler Corporation, Highland Park, Mich.

[21] Appl. No.: 189,612

[22] Filed: Jan. 27, 1994

[51] Int. Cl.6 .............................................. H01H 9/00
[52] U.S. Cl. .................................................. 200/61.54
[58] Field of Search ............... 200/61.54, 61.55, 61.56, 200/61.57, 293-307; 280/728 A, 731, 750; 74/484 R, 484 H, 552

[56] References Cited

U.S. PATENT DOCUMENTS

| | | | |
|---|---|---|---|
| 4,325,568 | 4/1982 | Clark et al. | 280/731 |
| 5,023,412 | 6/1991 | Ishida | 200/61.54 |
| 5,222,415 | 6/1993 | Fujita et al. | 74/552 |
| 5,228,362 | 7/1993 | Chen et al. | 74/552 |
| 5,314,203 | 5/1994 | Adams et al. | 280/728 A |

Primary Examiner—J. R. Scott
Attorney, Agent, or Firm—Edward A. Craig

[57] ABSTRACT

Apparatus for mounting a speed control switch housing on the steering wheel assembly of an automobile. The steering wheel assembly defines an enclosure for an air bag canister. The switch housing is applied over an opening in the enclosure adjacent to the free end portion of a mounting bracket in the enclosure. The housing has a pair of hollow bosses extending toward but spaced from the free end portion of the mounting bracket. The mounting bracket is flexibly resilient and capable of flexing toward and away from the speed control switch housing. Screws carried by the bosses thread into the free end portion of the mounting bracket with sufficient tension to flex the free end portion toward the bosses but without contacting the bosses so that the speed control switch housing is drawn securely against a wall of the steering wheel assembly.

4 Claims, 3 Drawing Sheets

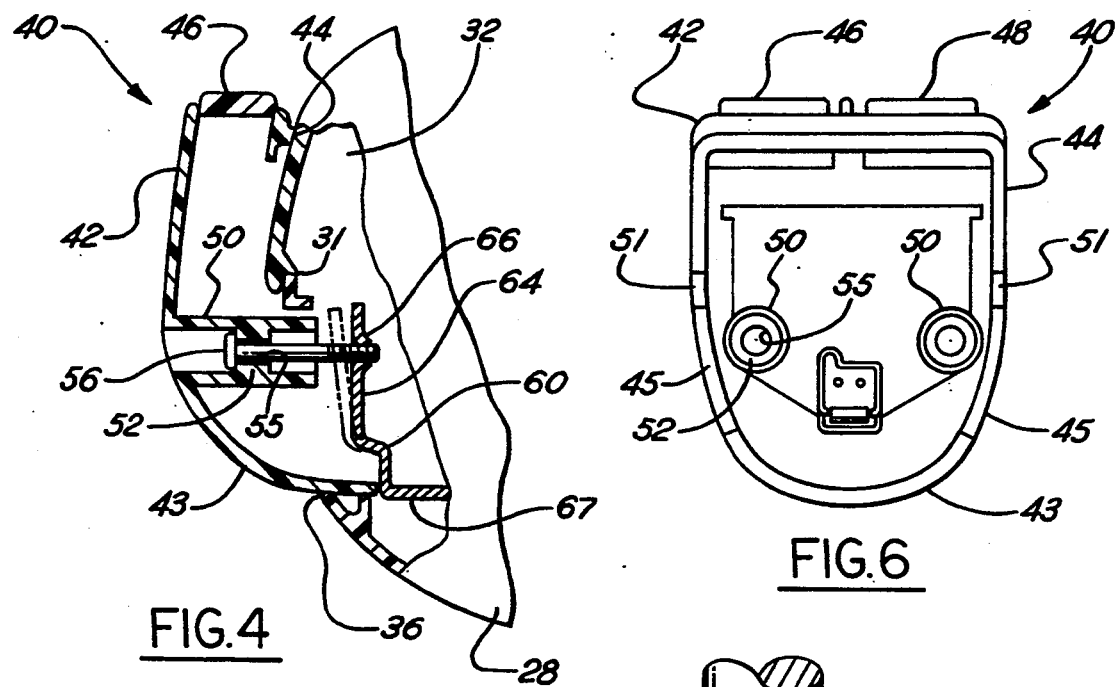
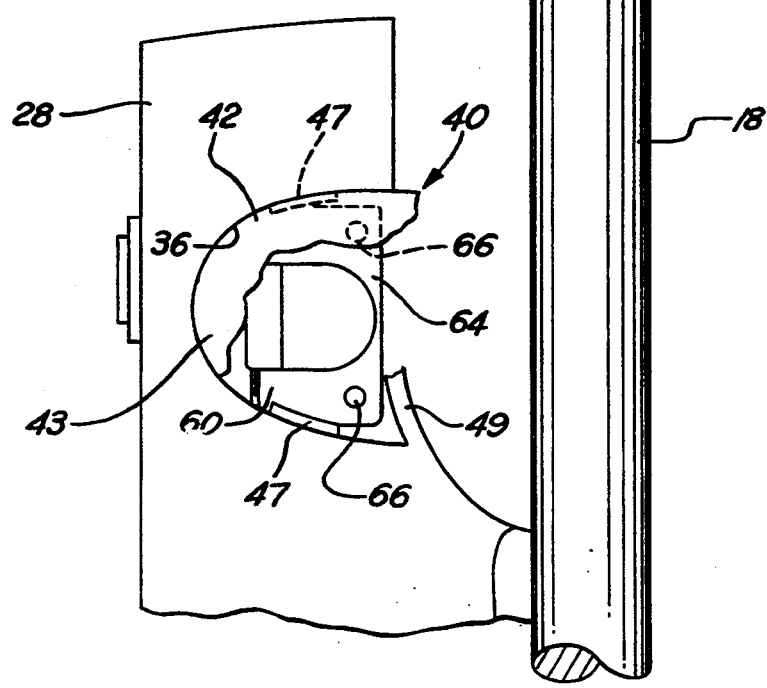

STEERING WHEEL INCLUDING SPEED CONTROL SWITCH AND ITS MOUNTING

This invention relates to apparatus for mounting a speed control switch on the steering wheel assembly of an automotive vehicle.

BACKGROUND AND SUMMARY

In the past, speed control switches have been mounted on the steering wheel assembly in a way which did not guarantee that they would seat properly. When the mounting screws were threaded into the usual rigid support structure, the housing bosses holding the mounting screws would often bottom out before the switch housing came into full contact with the steering wheel assembly. This would produce a visible gap, and resulted in non-uniform tensioning of the mounting screws.

In accordance with the present invention, a mounting bracket is provided on the steering wheel assembly which has a flexibly resilient free end portion capable of flexing toward and away from the speed control switch housing. Screws carried by the bosses on the speed control switch housing threadedly engage this flexible portion of the mounting bracket with sufficient tension to flex it toward the bosses but without actually contacting the bosses. As a result, the speed control switch housing is drawn securely against the wall of the steering wheel assembly without the objectional gap. Moreover, the screws will be applied with uniform tension.

One object of this invention is to provide a mounting for a speed control switch housing having the foregoing features.

Another object is to provide a mounting for a speed control switch housing which is composed of a relatively few simple parts, is rugged and durable in use, insures proper contact between the switch housing and the steering wheel assembly in a consistent manner without the formation of visible gaps, provides for uniform tensioning of the mounting screws, and is relatively easy to manufacture and assemble.

Other objects, features and advantages of the invention will become more apparent as the following description proceeds, especially when considered with the accompanying claims and drawings.

BRIEF DESCRIPTION OF THE DRAWINGS

FIG. 4 is a fragmentary view of a portion of the structure in FIG. 3, showing the flexed condition of the mounting bracket in dotted lines when the screw is tightened to fully mount the speed control switch.

FIG. 5 is a fragmentary elevation on the line 5—5 in FIG. 1, with a portion of the speed control switch removed.

FIG. 6 is an elevational view of a speed control switch as viewed from the inner side.

DETAILED DESCRIPTION

Figure 1:
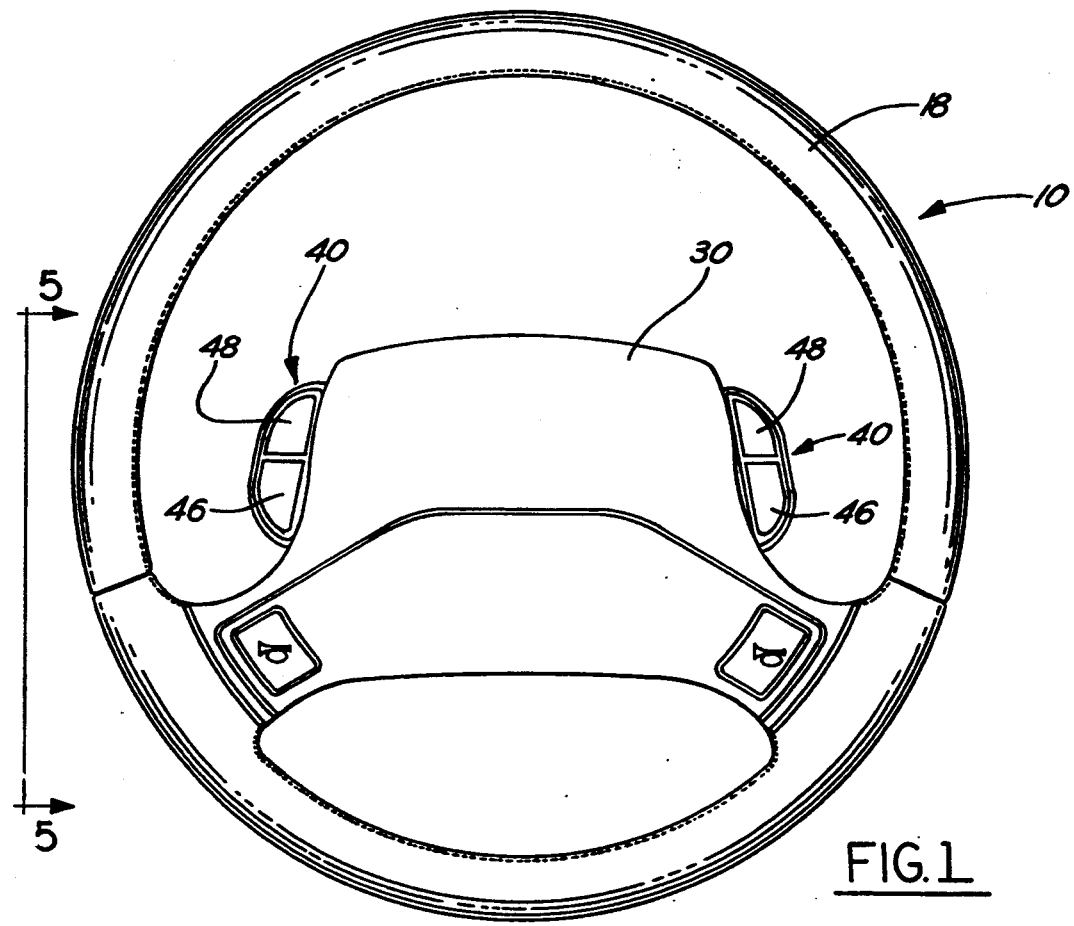
FIG. 1 is a plan view of a steering wheel assembly and attached speed control switches embodying the invention.
Figure 2:
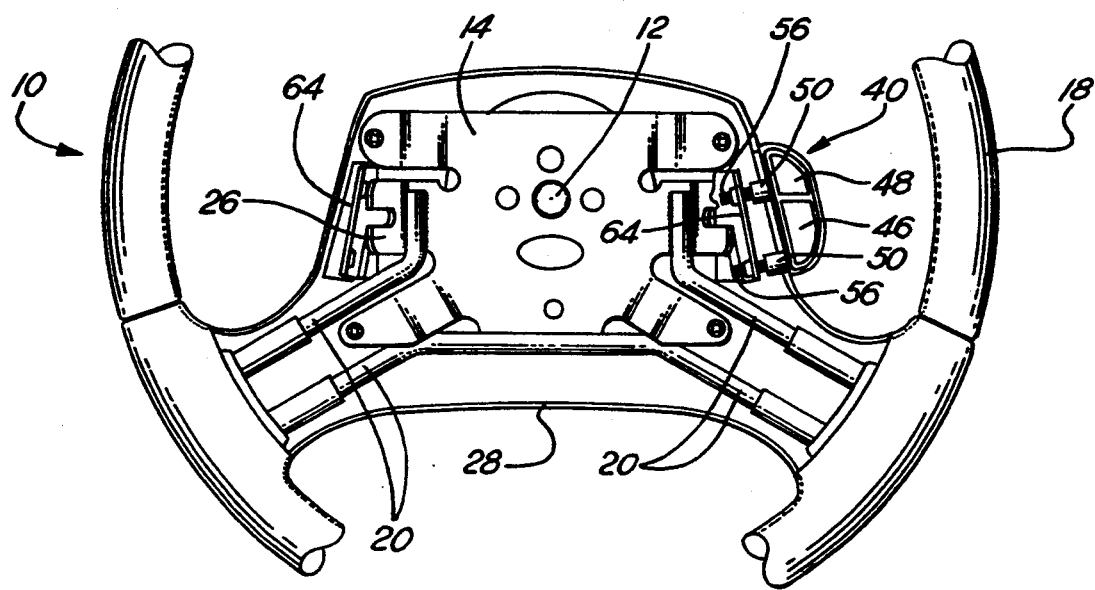
FIG. 2 is a fragmentary view similar to FIG. 1, but with the top cover removed. The air bag and air bag canister and one of the speed control switches have also been removed.

Referring now more particularly to the drawings, a steering wheel assembly 10 is mounted on the upper end of the steering column 12 of an automotive vehicle. The steering wheel assembly 10 has a plate 14 secured to the upper end of the steering column. A steering wheel 18 is rigidly mounted to the plate 14 by bars 20 which are welded or otherwise rigidly secured at their ends to the steering wheel 18 and the plate 14.

A canister 22 for an air bag has mounting tabs 24 secured by nut and bolt assemblies 25 to the upturned annular flange 26 of plate 14. The steering wheel assembly has a dished or pan-shaped back shroud 28 secured to the steering column 12. The back shroud 28 and an air bag cover 30 form an enclosure 32 for the air bag and its supporting canister 22. The back shroud 28 and cover 30 engage along the meeting line 31.

The back shroud 28 has two openings 36, one on each side, providing access to the interior of the enclosure 32. A speed control switch 40 is provided over each opening 36. The speed control switch 40 has a cup-shaped housing 42 provided with an inverted, U-shaped ridge 44 along the top and upper side portions which contacts the outer wall of the cover 30 above the opening 36 without any gap. The lower part 43 of the housing extends through the opening 36 into the enclosure 32. The sides 45 of the lower part 43 seat on rests 47 which project inwardly from the sides of opening 36 inwardly of the outer surface of the back shroud 28. The width and shape of the lower part 43 of the housing 42 closely match the width and shape of the opening 36 so that the lower part 43 enters the opening 36 without any visible gap. The surfaces 51 beneath the ends of ridges 44 contact the outer surface 49 of back shroud 28 above the opening 36. The details of the speed control switch are not important to this invention, but the switch may be operated by control buttons 46 and 48 mounted in the top of the switch housing.

Each speed control switch housing 42 has two laterally spaced parallel tubular bosses 50 which extend inwardly from the housing. These bosses are cylindrical and open-ended and each has an internal transverse wall 52 formed with an aperture 55 to receive a mounting screw 56. The screws 56 extend through the apertures 55 and the heads of the screws contact the internal walls 52.

Figure 3:
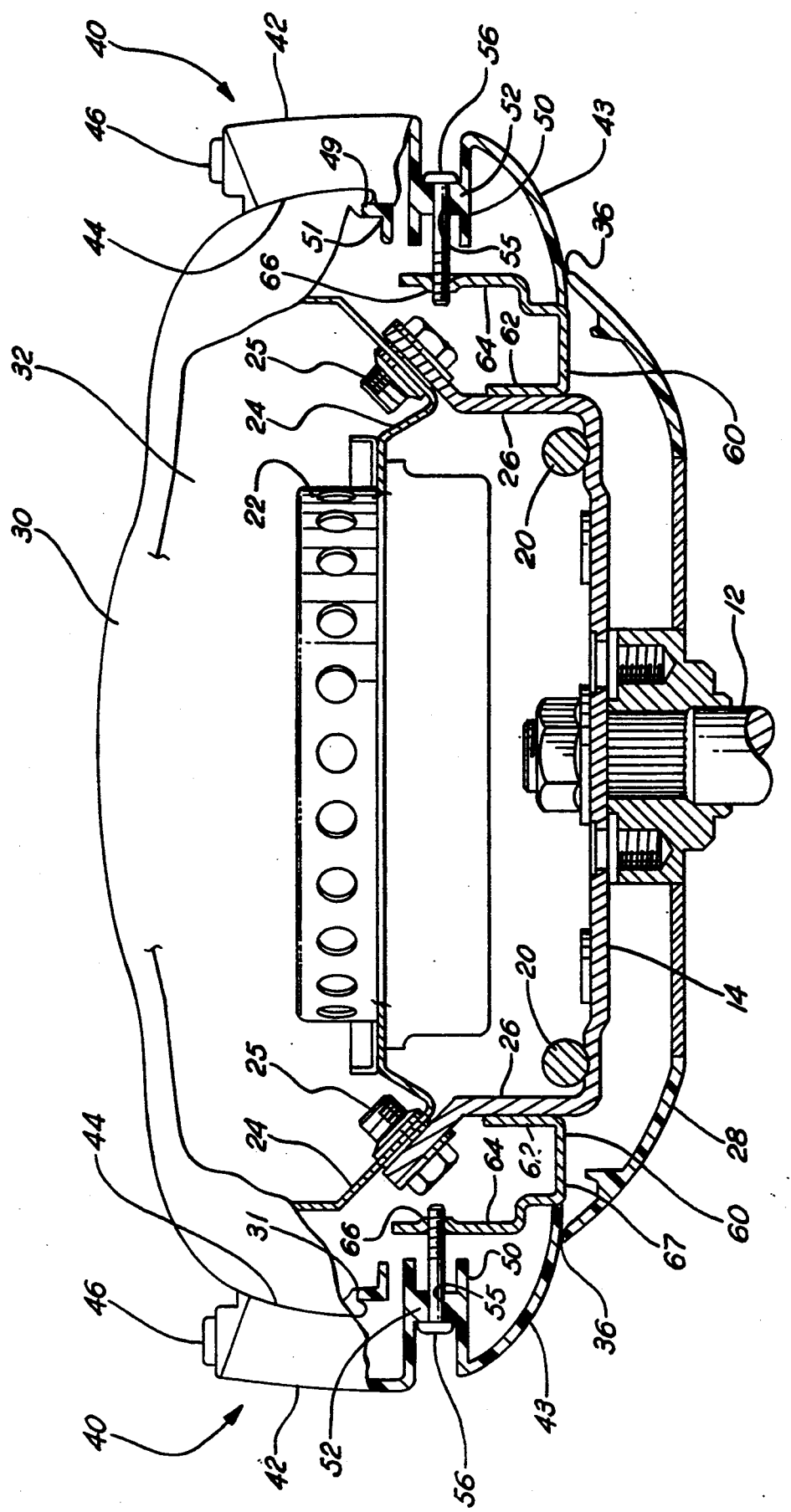
FIG. 3 is an enlarged view at right angles to FIGS. 1 and 2 partly in elevation and partly broken away.

Two mounting brackets 60 are provided within the enclosure 32, one for each speed control switch. Each bracket 60 is preferably in the form of a metal plate which has a tab 62 at one end rigidly secured, as by welding, to the outer surface of the annular flange 26 of plate 14. The bracket 60 extends in a U-shape from the tab as viewed in FIG. 3 and has a free end portion 64 at the other end which extends upwardly across the opening 36, being spaced inwardly from the opening. This free end portion 64 is flexibly resilient, and capable of flexing toward and away from the speed control switch 40 mounted over the opening. The free end portion 64 has two tapped holes 66 spaced apart in the same laterally spaced relation as the mounting screws 56 carried by the switch housings. The lower part 43 of the switch housing 42 abuts the base 67 of the bracket 60.

In use, the switch housings 42 are placed over the openings 36 with the mounting screws 56 and their supporting bosses 50 aligned with the tapped holes 66 in the flexible free end portions 64 of the mounting brackets 60. Since the bosses 50 are open ended, the screws 56 of each switch housing 42 may be threaded into the tapped holes 66 in the flexible free end portion 64 by a screwdriver extended into the bosses from the outer side of the housing. The screws 56 are applied with a consistent and uniform tension, which can best be accomplished by a power-operated screwdriver. Enough tension is applied to cause the flexible free end portions 64 of the brackets 60 to flex toward the bosses, but without actually contacting the bosses, so that the speed control switch housings 42 are drawn securely against the bracket 60 and cover 30 of the steering wheel assembly. This would not be possible in a consistent manner if the bosses of the switch housing were to actually bottom against a rigid mounting plate.

In this securely mounted position, each switch housing 42 has its ridge 44 is firm and continuous contact with the wall of the cover 30 above the opening 36. The lower part 43 of the housing extends into the enclosure 32 through the opening 36 with the lower extremity of the lower part 43 abutting the base 67 of bracket 60. There is no visible gap and the screws are uniformly tensioned.

What is claimed is:

1. Apparatus for mounting a speed control switch housing on a wall of the steering wheel assembly of an automotive vehicle, comprising a mounting bracket having one end portion rigidly secured to said steering wheel assembly and also having a free end portion, means including said mounting bracket mounting said speed control switch housing on the wall of said steering wheel assembly adjacent to the free end portion of said mounting bracket, said means also including a pair of screws, a pair of laterally spaced tubular bosses on said speed control switch housing extending toward but spaced from the free end portion of said mounting bracket, the free end portion of said mounting bracket being flexibly resilient and capable of flexing toward and away from said speed control switch housing, and said screws being carried by said bosses and threadedly engaging the free end portion of said mounting bracket with sufficient tension to flex said free end portion toward said bosses but without contacting said bosses so that said speed control switch housing is drawn securely against the wall of said steering wheel assembly.

2. Apparatus as defined in claim 1, wherein said wall of said steering wheel assembly has an opening, said mounting bracket extends transversely of said opening in spaced relation thereto, and said speed control switch housing contacts the wall of said steering wheel assembly adjacent said opening.

3. Apparatus for mounting a speed control switch housing on a wall of the steering wheel assembly of an automotive vehicle, said steering wheel assembly having an enclosure for an air bag canister, a plate in said enclosure rigidly connected to said steering wheel assembly and connected to the steering column of the vehicle, said enclosure having a wall provided with an opening, a mounting bracket within said enclosure, said mounting bracket being generally U-shaped, said bracket having one end portion rigidly secured to said plate and also having a free end portion extending transversely of said opening in spaced relation thereto, means including said mounting bracket mounting said speed control switch housing on said wall over the opening therein adjacent to the free end portion of said mounting bracket, said means also including a pair of screws, a pair of tubular bosses on said speed control switch housing extending toward but spaced from the free end portion of said mounting bracket, the free end portion of said mounting bracket being flexibly resilient and capable of flexing toward and away from said speed control switch housing, and said screws being carried by said bosses and threadedly engaging the free end portion of said mounting bracket with sufficient tension to flex said free end portion toward said bosses but without contacting said bosses so that said speed control switch housing is drawn securely against said wall of said steering wheel assembly.

4. Apparatus as defined in claim 3, wherein a portion of said speed control switch housing extends into said enclosure through said opening and abuts said bracket.

* * * * *